United States Patent
Sakamaki et al.

(10) Patent No.: US 7,402,326 B2
(45) Date of Patent: Jul. 22, 2008

(54) PROCESS FOR PRODUCING COOKED NOODLES

(75) Inventors: Yawara Sakamaki, Tokyo (JP); Satoko Matsubayashi, Tokyo (JP); Machiko Endo, Tokyo (JP); Satoshi Nomura, Tokyo (JP)

(73) Assignee: Nisshin Foods Inc., Tokyo (JP)

( * ) Notice: Subject to any disclaimer, the term of this patent is extended or adjusted under 35 U.S.C. 154(b) by 572 days.

(21) Appl. No.: 10/876,554

(22) Filed: Jun. 28, 2004

(65) Prior Publication Data

US 2005/0031745 A1 Feb. 10, 2005

Related U.S. Application Data

(63) Continuation-in-part of application No. 10/810,658, filed on Mar. 29, 2004.

(30) Foreign Application Priority Data

| Mar. 27, 2003 | (JP) | ............................... 2003-086727 |
| Oct. 22, 2003 | (JP) | ............................... 2003-361761 |
| Oct. 27, 2003 | (JP) | ............................... 2003-365713 |

(51) Int. Cl.
*A23L 1/162* (2006.01)

(52) U.S. Cl. .................. 426/557; 426/451; 426/521

(58) Field of Classification Search .................. None
See application file for complete search history.

(56) References Cited

U.S. PATENT DOCUMENTS

| 5,599,573 | A | * | 2/1997 | Barnes et al. ............... 426/451 |
| 5,707,672 | A | | 1/1998 | Taguchi et al. |
| 5,834,049 | A | | 11/1998 | Kageyama |
| 5,916,620 | A | * | 6/1999 | Oh ............................. 426/557 |

FOREIGN PATENT DOCUMENTS

| EP | 0 570 122 | 11/1993 |
| EP | 0 692 198 | 1/1996 |
| EP | 0 899 195 | 3/1999 |
| JP | 63-123350 | 5/1988 |
| JP | 4-370081 | 12/1992 |
| JP | 5-015330 | 1/1993 |
| JP | 6-014733 | 1/1994 |
| JP | 3024090 | 5/1996 |
| JP | 9-248148 | 9/1997 |
| JP | 10-276695 | 10/1998 |

OTHER PUBLICATIONS

Liu, Sui-juan, "Explorations on Technology and Equipment of Fresh Instant Noodles", Packaging and Food Machinery, vol. 15, No. 3, 1997, pp. 16-20.

* cited by examiner

*Primary Examiner*—Lien Tran
(74) *Attorney, Agent, or Firm*—Young & Thompson

(57) ABSTRACT

A process of producing cooked noodles, including the step of heating cooked noodles by direct contact with saturated steam at 105° to 150° C. or the step of heating comprising the substeps of directly applying saturated steam at 105° to 150° C. to cooked noodles intermittently and steaming the noodles by direct contact with saturated steam at 90° to 100° C. The resulting cooked noodle product is preservable for a long time without the aid of additives and yet keeps a pleasant texture.

6 Claims, No Drawings

PROCESS FOR PRODUCING COOKED NOODLES

This application is a continuation-in-part of co-pending Application Ser. No. 10/810,658, filed on Mar. 29, 2004. U.S. application Ser. No. 10/810,658 claims priority to Japan Application No. 2003-365713 filed Oct. 27, 2003, which claims priority to Japan Application No. 2003-361761 filed Oct. 22, 2003, which claims priority to Japan Application No. 2003-86727 filed on Mar. 27, 2003, the entire contents of which are hereby incorporated by reference.

BACKGROUND OF THE INVENTION

1. Field of the Invention

The present invention relates to a process for producing a cooked noodle product packaged for ambient temperature distribution that keeps pleasant organoleptic quality such as texture for a long period of time without the aid of additives.

2. Description of the Related Art

It is said that boiled noodles are most palatable with highest viscoelasticity and a firm and bouncy texture immediately after boiled. With time after that, boiled noodles loose the texture.

To overcome this problem, it has been proposed to add transglutaninase to dough comprising cereal flour and other raw materials (see JP-A-6-14733) or to add transglutamninase and gliadin or glutenin to such noodle dough (see JP-A-10-276695).

However, the recent consumers tend to avoid foodstuffs containing additives.

One of the latest trends in food is the demand for convenience. A variety of pre-cooked foods that can be easily and quickly served simply by, for example, pouring hot water or microwaving are now widespread. The trend to convenience is seen for noodle products as well.

Before cooked noodle can be subjected to ambient temperature distribution, it is necessary to control growth of microorganisms. To address this problem, it is known that cooked noodles as well as other cooked foodstuffs can be sterilized by heating under pressure after packing as in retort sterilization technology.

However, heat/pressure sterilization of cooked noodles after packing is disadvantageous in that the tissue of the noodle is changed while heated under pressure as packed in a closed container. Seeing that a texture to the teeth is of great significance for noodle products, the change of noodle's tissue, which heavily affects the texture, is a serious problem. It has therefore been demanded to establish a sterilization technique for cooked noodles that can replace the post-packaging heat/pressure sterilization to achieve microorganism control without impairing the tissue of the noodles.

Japanese Utility Model 3024090 teaches a method of producing cooked noodles which solves the microorganism control problem without involving post-packaging heat/pressure sterilization that may change the tissue of cooked noodles. In the method, a UV sterilized tray is filled with cooked noodles, sterilized in a closed chamber with pressurized steam at 100° C. or higher, preferably 130 to 140° C., and sealed in a clean booth. The step of sterilization is carried out either continuously for consecutive several tens of seconds to several tens of minutes or by repeating about 6 to 8 cycles of sterilization for 6 to 10 seconds per cycle.

According to this method, however, the tray in which sterilized noodles are to be put must previously be UV sterilized so that a UV sterilizer, which is a large-sized apparatus, is required. Moreover, the method involves troublesome steps. Because food trays are made of, for the most part, organic polymer materials, there is a fear that the organic polymer material undergoes radical reaction on UV irradiation, resulting in forming carcinogenic chemicals or endocrine-disrupting chemicals.

When sterilized continuously for several tens of seconds to several tens of minutes as in the above-described method, cooked noodles lose firmness to the teeth and become overly soft. When intermittently given about 6 to 8 cycles of sterilization for 6 to 10 seconds each, safety cannot be secured particularly where the number of initial microbial cells is great.

A food processing method including filling a container with a foodstuff, heat/pressure sterilizing the container and contents, and aseptically sealing the container (see JP-A-4-370081) is also known effective for preserving cooked foods.

Heat/pressure sterilization is generally a high temperature/high pressure treatment with steam at 100° C. or higher. To carry out the method of JP-A4-370081, after the container and contents are heat/pressure sterilized in a chamber of a heat/pressure sterilizer, the inner pressure of the chamber should be released to atmospheric pressure by venting before sealing.

When the chamber of a heat/pressure sterilizer is released to the atmosphere after sterilization, it has been the practice mostly followed to vent the chamber at a time in nature of the structure of the equipment and the like. Such a manner of venting is disadvantageous in that the food bursts out of the container to contaminate the opening of the container to be sealed, which results in not only short weight packages but incomplete sealing. This occurs with solid foods cooked by stewing, boiling, steaming or browning in oil or oiled solid foods, especially those cooked by stewing, boiling or steaming.

Some long-life foods such as long-life noodles that have recently been developed enjoy long term preservability secured by their lowered pH. In order to guarantee such preservability, not only the surface but also the inside of a foodstuff must be adjusted to a low pH when microorganisms are expected to be there. To adjust the pH of a foodstuff even to the inside makes of necessity the inside of the foodstuff sour in taste and smell. Such sour taste and smell are not favorable for palatability and flavor of many foods.

To overcome these problems, JP-A-5-15330 discloses a method of producing a preservable boiled noodle product comprising preparing dough containing glucono-delta-lactone, cutting sheeted dough into noodle strands, boiling the noodles, dipping the boiled noodles in a mixed aqueous solution containing adipic acid and a sweetener to adjust the pH of the noodles to 4.5 or lower, packing the noodles in a film container, and heat sterilizing the package. JP-A-9-248148 proposes a preservative for boiled noodles comprising an acid as a pH adjustor, a sugar, and an animal or vegetable protein hydrolyzate. However, the method and the preservative cannot be seen as satisfactory.

SUMMARY OF THE INVENTION

A first object of the present invention is to provide a process for producing cooked noodles which keep a pleasant texture for a long period of time without the aid of additives.

A second object of the invention is to provide a process for producing cooked noodles packaged for ambient temperature distribution which achieves microorganism control without causing change of the tissue of the noodles that can result in deterioration of texture.

A third object of the invention is to provide a process of producing cooked noodles packaged for ambient temperature distribution which prevents noodles packed in a container and heat/pressure sterilized from bursting out of the container when the environment is vented to atmospheric pressure.

A fourth object of the invention is to provide a process of producing cooked noodles packaged for ambient temperature distribution which have been acid-treated for long term preservability and yet keep good quality without being affected by sour taste or smell as a result of the acid treatment.

The first object of the invention is accomplished by a process of producing cooked noodles which includes the step of heating cooked noodles by direct contact with saturated steam at 105° to 150° C. (120 to 480 kPa). This process will hereinafter be sometimes referred to as a first process of the present invention.

The second object of the invention is accomplished by a process of producing cooked noodles packaged for ambient temperature distribution which includes the step of heating cooked noodles. The step of heating comprises the substeps of directly applying saturated steam at 105° to 150° C. to cooked noodles intermittently and steaming the noodles by direct contact with saturated steam at 90° to 100° C. This process will hereinafter be sometimes referred to as a second process of the invention.

The third object of the invention is achieved by a process of producing cooked noodles packaged for ambient temperature distribution which is based on the first or second process of the invention. In the process, steam having a temperature higher than 115° C. is used as saturated steam in the step of heating, and the process comprises the steps of packing cooked noodles in a container having an opening, heating the container and contents according to the first process or the first substep of the second process in the chamber of a heat/pressure sterilizer, slowly decreasing the inner pressure and temperature of the chamber until the inner temperature drops to 105° to 115° C. by operating a pressure control valve of the sterilizer, further decreasing the inner pressure of the chamber to atmospheric pressure, and aseptically sealing the opening of the container. Optionally, the process further includes the step of steaming the container and contents with saturated steam at 90° to 100° C. before the step of sealing. This process will hereinafter be sometimes referred to as a third process of the invention.

The third object of the invention is also achieved by a process of producing cooked noodles packaged for ambient temperature distribution which is based on the first and second processes of the invention and further includes the steps of packing cooked noodles in a container having an opening and pouring a fat and oil in the container before the step of heating. This process will hereinafter be sometimes referred to a fourth process of the invention.

The fourth object of the invention is accomplished by a process of producing a cooked noodle packaged for ambient temperature distribution which is based on the first and second processes of the invention, wherein the cooked noodles are acid-treated, low-pH noodles, and the process further includes the step of incorporating into the low pH noodle 0.05 to 2.5% by weight of at least one of sugar and non-sugar sweeteners and 0.02 to 0.85% by weight of sodium chloride or the step of treating the low pH noodles with a solution containing at least one of sugar and non-sugar sweeteners and a solution containing a sodium chloride. This process will hereinafter be sometimes referred to a fifth process of the present invention.

The first process of the present invention provides cooked noodles that maintain pleasant texture and flavor even when preserved for a long period of time.

The second process of the present invention provides cooked noodles packaged for ambient temperature distribution that have been subjected to aseptic treatment for microorganism control without undergoing change in tissue which can impair the texture of the noodles.

According to the third and fourth processes, the noodles are prevented from bursting from the opening of the container when the inner pressure of a heat/pressure sterilizer is released to atmospheric pressure. As a result, the aseptic treatment and the subsequent sealing step can be carried out smoothly and perfectly.

The fifth process of the present invention provides cooked noodles packaged for ambient temperature distribution that withstand long-term preservation and have excellent palatability free from sour taste and smell resulting from an acid treatment.

DESCRIPTION OF THE PREFERRED EMBODIMENT

In the first process of the present invention, saturated steam at 105° to 150° C. (vapor pressure of 120 to 480 kPa) is brought into direct contact with cooked noodles, such as boiled noodles. This can be done by, for example, ejecting saturated steam at 105° to 150° C. directly toward the noodles.

If the temperature of the steam is lower than 105° C., the resulting noodles have no chewy (firm to bite) texture. Steam at a higher temperature than 150° C. destroys the noodles' tissue, resulting in no chewy texture.

The treating time with the steam is preferably 10 to 300 seconds, still preferably 30 to 180 seconds.

The noodles to be cooked and packaged by the first process of the present invention include udon (wheat noodles), soba (buckwheat noodles), hiyamugi (thinner than udon), somen (thinner than hiyamugi), Korean buckwheat noodles, Chinese noodles, macaroni, and spaghetti. Korean buckwheat noodles, Chinese noodles, macaroni, and spaghetti are particularly suitable.

The cooked noodles having been treated by the first process is aseptically sealed in a container for ambient temperature distribution. The cooked noodles obtained by the first process maintain a satisfactory texture for a long period of time. Even if the noodles obtained by the first process are subjected to acid treatment or retort treatment or refrigerated or frozen, they keep their viscosity and elasticity or a firm and bouncy texture.

The second process of the present invention is characterized in that the step of heating cooked noodles includes the substeps of applying saturated steam at 105° to 150° C. to cooked noodles intermittently and steaming the noodles with saturated steam at 90 to 100° C.

The cooked noodles that are suitable to the second process are those prepared by boiling noodle strands to a yield of 190 to 330%, preferably 210 to 310%. The kinds of the noodles include those recited with respect to the first process.

The heating with saturated steam at 105° to 150° C. should be carried out by intermittently and directly applying a jet of the saturated steam to the cooked noodles. The treating time for each steam application operation varies depending on the temperature of the steam and the amount of the noodles to be treated. Usually, a jet of steam is applied for 5 to 60 seconds for an amount of about 50 to 300 g of cooked noodles. Application of steam is preferably repeated about five to 10 times.

The steam is preferably applied such that the steam jet may directly be struck against the noodles. By so doing, the effect on microorganism control is improved.

The time interval between the operations of steam application varies according to the amount of the noodles to be treated. With the amount of the noodles ranging from about 50 to 300 g which is a usual weight per package, the time interval is preferably 0.5 to 10.0 seconds.

The noodles heated with saturated steam at 105° to 150° C. are then heated by direct contact with saturated steam at 90° to 100° C. The heating time is preferably 10 to 45 minutes.

The third process of the present invention is based on the first or second process and is characterized by including the steps of packing cooked noodles in a container having an opening, heating the container and contents with saturated steam at a temperature higher than 115° C. in the chamber of a heat/pressure sterilizer, slowly decreasing the inner pressure and temperature of the chamber until the inner temperature drops to 105° to 115° C., further decreasing the inner pressure of the chamber to atmospheric pressure, and aseptically sealing the opening of the container. Optionally, the container and contents are heat-treated with saturated steam at 90° to 100° C. before the step of sealing.

The container used to pack the cooked noodles includes, but is not limited to, pouches made of transparent materials, aluminum, etc., trays made of transparent materials, aluminum, etc., and cans.

The container and contents (cooked noodles) is placed in the chamber of a heat/pressure sterilizer and heated with saturated steam at a temperature higher than 115° C. (the temperature falling within the range specified in the first or second process, i.e., the range of from 105° to 150° C.). After completion of the heat treatment, the inner pressure and temperature of the chamber are slowly reduced until the inner temperature drops to 105° to 115° C. by the operation of a pressure control valve. If this operation of pressure drop is stopped when the inner temperature is still higher than 115° C., the contents may burst out from the container during the subsequent step of pressure drop to atmospheric pressure. Once the inner pressure is dropped to reduce the temperature to 105° to 115° C., the contents never bursts out even if the inner pressure is further reduced to atmospheric pressure at a time.

The slow inner pressure drop to an inner temperature of 105° to 115° C. can be effected either stepwise or continuously. In the former case, where the steam used in the heat treatment has a relatively low temperature so that the initial inner pressure of the chamber is relatively low, the pressure can be dropped to the aimed level, i.e., a temperature between 105° and 115° C., through a single step of pressure release. Where the steam temperature is relatively high so that the initial inner pressure is relatively high, the inner pressure should be dropped through a plurality of steps for pressure and temperature drop. The pressure drop for each pressure release is preferably controlled such that a temperature change is within 15° C. at a time.

After the inner temperature of the chamber is dropped to 105° to 115° C., the inner pressure is further reduced to atmospheric pressure continuously, stepwise, or at a time. For operational efficiency, it is preferred to reduce the pressure at a time.

The thus sterilized noodles are then sealed aseptically to be distributed and sold on the market. Optionally, the sterilized noodles can be further heat-treated with saturated steam at 90° to 100° C. before being aseptically sealed.

The fourth process of the present invention includes the same step of heating according to the first or second process and is characterized by further including the step of pouring a fat and oil into the container packed with the cooked noodles before the step of heating.

The container that can be used in the fourth process include those recited above with respect to the third process of the present invention.

The amount of a fat and oil to be poured into the container is usually 0.05 to 10% by weight, preferably 0.1 to 7% by weight, based on the noodles in the container. Less than 0.05% by weight of a fat and oil produces little effect of addition. Addition of more than 10% by weight makes the noodles too oily and tends to impair the palatability and flavor.

The fats and oils which can be used in the fourth process include plant oils, such as soybean oil, rape seed oil, cotton seed oil, rice oil, corn oil, sesame oil, peanut oil, sunflower oil, safflower oil, camellia oil, olive oil, linseed oil, and tung oil; plant fats, such as coconut butter, palm oil, palm kernel oil, and cacao butter; marine animal oils, such as sardine oil, whale oil, and herring oil; and land animal fats, such as lard, beef tallow, and milk fat.

After the fat and oil is added, the container is placed in the chamber of a heat/pressure sterilizer and heated in the same manner as in the first or second process. After the heat treatment, the inner pressure of the chamber is released to the atmospheric pressure by any methods available. For example, the inner pressure can be dropped to the atmospheric pressure at a time, stepwise, or continuously. From the standpoint of working efficiency, the method of dropping the pressure at a time is suited. Even when the inner pressure is dropped to the atmospheric pressure at a time, the noodles do not burst out of the container.

The container containing the fat/oil-added and heat-treated noodles is then aseptically sealed in a usual manner to provide a cooked noodle package for ambient temperature distribution. Optionally, the sterilized noodles can be further heat treated with saturated steam at 90° to 100° C. before being aseptically sealed.

The fifth process of the present invention includes the same heating step of the first or second process and is characterized in that the cooked noodles are acid-treated, low-pH noodles which contain 0.05 to 2.5% by weight of at least one of sugar and non-sugar sweeteners and 0.02 to 0.85% by weight of sodium chloride or which have been treated with a solution containing at least one of sugar and non-sugar sweeteners and a solution containing a sodium chloride.

The acid which can be used to treat noodles for pH adjustment is not particularly limited as long as it is permitted to be added to foodstuffs. A preferred acid is a combination of lactic acid and gluconic acid, which achieves pH adjustment with a smaller amount and results in milder sour taste and smell than other acids.

In order to secure preservability of the low pH noodles, the cooked noodles should be kept at a pH of 4.0 to 5.0. Where the noodles are treated with an acid solution for that purpose, it is preferred to use an acid solution having a pH of 2.0 to 5.0.

Sugar sweeteners which can be used as one of substances capable of suppressing sour taste and smell of the low pH noodles include sucrose, maltose, fructose, glucose, and oligosaccharides.

In order to suppress the sour taste and smell, at least one of the sugar or non-sugar sweeteners should be present in the low pH noodles in an amount of 0.05 to 2.5% by weight. Where the low pH noodles are treated with a solution containing the sugar or non-sugar sweetener(s), the object of the fifth process can be achieved usually by using the solution having a concentration of 0.1 to 5% by weight.

Sodium chloride, which is another substance capable of suppressing sour taste and smell of the low pH noodles, should be present in the low pH noodles in an amount of 0.02 to 0.85% by weight. Where the low pH noodles are treated with a solution containing sodium chloride, the object of the fifth process can be achieved usually by using a sodium chloride aqueous solution having a concentration of 0.1 to 3.0% by weight.

Methods for preparing the low pH noodles used in the fifth process include (1) a method comprising treating noodles with a mixed solution prepared by mixing predetermined amounts of sodium chloride and a sweetener (selected from sugar and non-sugar sweeteners) into an acid solution for acid treatment, (2) a method comprising treating acid-treated low pH noodles separately with a sodium chloride aqueous solution and a sweetener solution, (3) a method comprising treating acid-treated low pH noodles with a mixed solution containing sodium chloride and a sweetener, and (4) a method comprising incorporating either one of sodium chloride and a sweetener into noodle dough and treating the resulting noodles with a solution of the other. For industrial production, the method (1) is preferred.

The treatment with a solution or solutions is conducted in various manners, such as immersion and spraying. For industrial production, immersion is the most suitable.

The present invention will now be illustrated in greater detail with respect to Examples, but it should be understood that the invention is not construed as being limited thereto. Unless otherwise noted, all the percents are by weight.

EXAMPLES 1 TO 4 AND COMPARATIVE EXAMPLES 1 TO 3

Spaghetti was boiled to a yield of 230%. The boiled spaghetti was heat treated by directly applying a jet of saturated steam whose temperature is shown in Table 1 below for the treating time shown in Table 1 and sealed in a container. In Comparative Example 1, the boiled spaghetti was sealed in a container without heat treatment with saturated steam.

One day after the sealing, the spaghetti was organoleptically evaluated for texture and flavor by ten panelists based on the scoring standard shown in Table 2. The averaged results of evaluation are shown in Table 1.

TABLE 1

|  | Example | | | | Comparative Example | | |
| --- | --- | --- | --- | --- | --- | --- | --- |
|  | 1 | 2 | 3 | 4 | 1 | 2 | 3 |
| Steam Temp. (° C.) | 105 | 120 | 140 | 150 | — | 100 | 160 |
| Treating Time (sec) | 30 | 30 | 30 | 30 | — | 30 | 30 |
| Texture | 4.3 | 4.8 | 4.7 | 4.5 | 3.2 | 3.5 | 2.1 |
| Flavor | 4.5 | 4.6 | 4.6 | 4.3 | 3.0 | 3.9 | 2.5 |

TABLE 2

| Item | Score | Evaluation Standard |
| --- | --- | --- |
| Texture | 5 | Al dente, ideal texture for spaghetti |
|  | 4 | Sufficiently firm and bouncy (chewy) |
|  | 3 | Firm and bouncy (chewy) |
|  | 2 | Soft and not chewy |
|  | 1 | Overly soft, with no chewiness |
| Flavor | 5 | Very strong flavor characteristic of durum wheat |
|  | 4 | Strong flavor characteristic of durum wheat |
|  | 3 | Flavor characteristic of durum wheat |
|  | 2 | Weak flavor characteristic of durum wheat |
|  | 1 | No flavor characteristic of durum whet |

EXAMPLES 5 TO 10 AND COMPARATIVE EXAMPLES 4 TO 7

Dried spaghetti (thickness: 1.6 mm) was boiled to a yield of 220% and dipped in water of 20° C. for 40 seconds. The boiled spaghetti was packed in containers in 200 g portions and heat treated by directly applying saturated steam intermittently under the conditions shown in Table 3 and then steaming with saturated steam at 100° C. for the heating time shown in Table 3. Immediately after the heat treatment, the container was sealed with a cover. The resulting boiled spaghetti packages were allowed to cool to room temperature and stored at that temperature for 1 week. After the one week storage, the spaghetti was inspected for growth of microorganisms to evaluate the microorganism control effect based on the standard shown in Table 4. Those samples which were judged to have microorganism control effect were heated up in a microwave oven and organoleptically evaluated for texture by a panel of ten members based on the scoring standard shown in Table 4. The averaged results of evaluation are shown in Table 3.

TABLE 3

|  |  | Example | | | | | | Comparative Example | | | |
| --- | --- | --- | --- | --- | --- | --- | --- | --- | --- | --- | --- |
|  |  | 5 | 6 | 7 | 8 | 9 | 10 | 4 | 5 | 6 | 7 |
| Conditions of Intermittent Application of | Temp. (° C.) | 105 | 120 | 135 | 150 | 120 | 120 | 150 | 105 | 150 | 150 |
|  | Time per Operation (sec) | 5 | 5 | 5 | 5 | 60 | 5 | 5 | 5 | 5 | 60 |

TABLE 3-continued

|  |  | Example | | | | | | Comparative Example | | | |
| --- | --- | --- | --- | --- | --- | --- | --- | --- | --- | --- | --- |
|  |  | 5 | 6 | 7 | 8 | 9 | 10 | 4 | 5 | 6 | 7 |
| Saturated Steam | Time Interval between Operations (sec) | 1 | 1 | 1 | 1 | 1 | 1 | — | — | 1 | 1 |
|  | Number of Operations | 5 | 5 | 5 | 5 | 5 | 5 | 1 | 1 | 5 | 5 |
| Heating time with Saturated Steam at 100° C. (min) | | 10 | 10 | 10 | 10 | 10 | 30 | 30 | 60 | — | — |
| Microorganism Control Effect | | yes | yes | yes | yes | yes | yes | no | yes | no | yes |
| Texture (average) | | 4.9 | 4.8 | 4.6 | 4.3 | 4.3 | 4.4 | —* | 3.1 | —* | 2.1 |

*(—) means that the organoleptic test was not conducted because of the mold growth.

TABLE 4

| Item | Score | Evaluation Standard |
| --- | --- | --- |
| Microorganism Control Effect | yes | No mold observed |
|  | no | Mold observed |
| Texture | 5 | Al dente |
|  | 4 | Sufficiently chewy (firm and bouncy) |
|  | 3 | Chewy |
|  | 2 | Soft and not chewy |
|  | 1 | Overly soft with no chewiness |

EXAMPLE 11

Dry spaghetti was boiled to a yield of 230%, and 200 g of the boiled spaghetti was packed in a nylon/polypropylene laminate tray (inner diameter: 120 mm; depth: 45 mm). The container and contents were placed in the chamber of a heat/pressure sterilizer and heated with saturated steam at 120° C. for 30 seconds. The pressure control valve of the chamber was opened once and closed, which resulted in an inner temperature of the chamber of 115° C. Subsequently, the pressure control valve was fully opened to completely release the inner pressure to the atmosphere. During the inner pressure reduction, the boiled spaghetti was held in place without bursting out of the tray. The opening of the container was aseptically sealed in a usual manner to obtain a boiled spaghetti package.

EXAMPLE 12

The same boiled spaghetti in a plastic tray as prepared in Example 11 was sterilized in the same manner as in Example 11, except for using saturated steam at 130° C. The pressure control valve of the chamber was opened once and closed, which resulted in an inner temperature of 120° C. The valve was again opened and closed, which resulted in an inner temperature of 110° C. Thereafter, the valve was fully opened to completely release the inner pressure of the chamber to the atmosphere. During the inner pressure reduction, the boiled spaghetti was held in place without coming out of the tray. The opening of the container was aseptically sealed in a usual manner to obtain a boiled spaghetti package.

COMPARATIVE EXAMPLE 8

Boiled spaghetti in a plastic tray as prepared in the same manner as in Example 11 was treated in the same manner as in Example 12 up to the step of once opening and closing the pressure control valve of the sterilizer to reducing the inner temperature of the chamber to 120° C. Thereafter, the valve was fully opened to completely release the inner pressure of the chamber to the atmosphere, during which step part of the boiled spaghetti burst out of the container.

EXAMPLE 13

A 200 g of boiled spaghetti (yield: 230%) was packed in a nylon/polypropylene laminate tray (inner diameter: 120 mm; depth: 45 mm), and 0.3 g of olive oil was dropped thereon. The container and contents were placed in the chamber of a heat/pressure sterilizer and heated with saturated steam at 120° C. for 30 seconds. The pressure control valve of the sterilizer was fully opened at a time to completely release the inner pressure to the atmosphere. During the inner pressure drop, the boiled spaghetti was held in place without bursting out of the tray. The opening of the container was aseptically sealed in a usual manner to obtain a boiled spaghetti package.

EXAMPLE 14

A 200 g of boiled spaghetti (yield: 230%) was packed in the same plastic tray as used in Example 13, and 10 g of olive oil was dropped thereon. The spaghetti in the tray was sterilized in the same manner as in Example 13, and the inner pressure of the chamber was released to the atmosphere pressure in the same manner as in Example 13. During the inner pressure drop, the boiled spaghetti was held in place without bursting out of the tray. The opening of the container was aseptically sealed in a usual manner to obtain a boiled spaghetti package.

COMPARATIVE EXAMPLE 9

A 200 g of boiled spaghetti (yield: 230%) was packed in the same plastic tray as used in Example 13 and, without addition of olive oil, sterilized in the chamber of a heat/pressure sterilizer, followed by pressure release in the same manner as in Example 13. During the inner pressure drop, the boiled spaghetti burst out of the tray. The container could not be completely sealed because the sealing area was soiled with the spaghetti.

EXAMPLES 15 TO 24 AND REFERENCE EXAMPLE 1

Dry spaghetti was boiled to a yield of 230%. The boiled spaghetti was immersed for 1 minute in a mixed aqueous solution containing 0.8% fermented lactic acid, 0.8% gluconic acid, 0.5% sodium chloride, and the sugar shown in Table 5 below in the concentration shown to obtain low pH spaghetti.

The resulting low pH spaghetti was organoleptically evaluated for sour taste and smell and palatability by ten panelists in accordance with the scoring standard described in Table 6. The averaged results of evaluation are shown in Table 5.

Additionally, the low-pH spaghettis obtained in Examples 15 to 24 were subjected to heat treatment with saturated steam in the same manner as in Example 2 or heat treatment by intermittent application of saturated steam at 120° C. followed by steaming with saturated steam at 100° C. in the same manner as in Example 6 and then sealed in the container. These low pH spaghetti packages were preservable at ambient temperature for a long period of time and had excellent palatability free of sourness in taste and smell.

TABLE 5

| Sugar in Mixed Solution | | Sugar Concn. in Low pH Paste (%) | NaCl Concn. in Low pH Paste (%) | Organoleptic Test | |
|---|---|---|---|---|---|
| Kind | Concn. (%) | | | Sour Taste and Smell | Palatability |
| Ex. 15 | sucrose | 0.1 | 0.076 | 0.154 | 4.3 | 5.0 |
| Ex. 16 | maltose | 0.1 | 0.275 | 0.151 | 4.2 | 5.0 |
| Ex. 17 | maltose | 0.5 | 0.326 | 0.148 | 4.6 | 5.0 |
| Ex. 18 | sucrose | 0.5 | 0.177 | 0.152 | 4.6 | 5.0 |
| Ex. 19 | fructose | 0.5 | 0.222 | 0.150 | 4.6 | 5.0 |
| Ex. 20 | maltose | 3.0 | 0.650 | 0.145 | 4.7 | 4.7 |
| Ex. 21 | sucrose | 3.0 | 0.535 | 0.146 | 4.7 | 4.7 |
| Ex. 22 | fructose | 3.0 | 0.854 | 0.143 | 4.7 | 4.7 |
| Ex. 23 | glucose | 5.0 | 0.985 | 0.141 | 4.6 | 5.0 |
| Ex. 24 | glucose | 10.0 | 2.002 | 0.140 | 4.7 | 4.7 |
| Ref. Ex. 1 | none | — | — | — | 1.5 | 5.0 |

TABLE 6

| Item | Score | Evaluation Standard |
|---|---|---|
| Sour Taste and Smell | 5 | No perceptible sour taste or smell |
| | 4 | Very slightly perceptible sour taste or smell |
| | 3 | Slightly perceptible sour taste or smell |
| | 2 | Clearly perceptible sour taste or smell |
| | 1 | Strong sour taste or smell |
| Palatability | 5 | No perceptible taste of sugar or salt |
| | 4 | Very slightly perceptible taste of sugar or salt |
| | 3 | Slightly perceptible taste of sugar or salt |
| | 2 | Clearly perceptible taste of sugar or salt |
| | 1 | Strong taste of sugar or salt |

EXAMPLES 25 TO 27

Dry spaghetti was boiled to a yield of 230%. The boiled spaghetti was immersed for 1 minute in a mixed aqueous solution containing 0.8% fermented lactic acid, 0.8% gluconic acid, 0.5% sodium chloride, and the maltooligosaccharide in the concentration shown in Table 7 to obtain low pH spaghettis.

The resulting low-pH spaghettis were organoleptically evaluated for sour taste and smell and palatability in the same manner as in Examples 15 to 24. The averaged results of evaluation are shown in Table 7.

Additionally, the low pH spaghettis obtained in Examples 25 to 27 were subjected to heat treatment with saturated steam in the same manner as in Example 2 or heat treatment by intermittent application of saturated steam at 120° C. followed by steaming with saturated steam at 100° C. in the same manner as in Example 6 and then sealed in the container. These low pH spaghetti packages were preservable at ambient temperature for a long period of time and had excellent palatability free of sourness in taste and smell.

TABLE 7

| Sugar in Mixed Solution | | Organoleptic Test | |
|---|---|---|---|
| Kind | Concn. (%) | Sour Taste or Smell | Palatability |
| Example 25 | maltooligo-saccharide | 0.1 | 4.3 | 5.0 |
| Example 26 | maltooligo-saccharide | 0.5 | 4.6 | 5.0 |
| Example 27 | maltooligo-saccharide | 3.0 | 4.6 | 4.7 |

What is claimed is:

1. A process of producing cooked noodles packaged for ambient temperature distribution, comprising the following steps:
   i) directly applying saturated steam at 105° to 150° C. to cooked noodles intermittently, and
   ii) after step i), steaming the cooked noodles by direct contact with saturated steam at 90° to 100° C., and
   iii) packing the cooked noodles of step ii).

2. The process of producing cooked noodles packaged for ambient temperature distribution according to claim 1, further comprising the steps of:
   packing cooked noodles in a container having an opening,
   heating the container and contents in a chamber of a heat/pressure sterilizer with saturated steam having a temperature higher than 115° C.,
   decreasing the inner pressure of the chamber until the inner temperature drops to 105° to 115° C.,
   further decreasing the inner pressure of the chamber to atmospheric pressure, and
   aseptically sealing the opening of the container,
   the process optionally including the step of heating the noodles with saturated steam at 90° to 100° C. before the step of sealing.

3. The process of producing cooked noodles packaged for ambient temperature distribution according to claim 1, further comprising the steps of:
   packing cooked noodles in a container having an opening and
   pouring a fat and oil in the container before the step of heating.

4. The process of producing cooked noodles packaged for ambient temperature distribution according to claim 1, wherein the cooked noodles are acid-treated at a pH of 4.0 to 5.0, and wherein said cooked noodles contain 0.05 to 2.5% by weight of at least one of sugar and non-sugar sweeteners and 0.02 to 0.85% by weight of sodium chloride.

5. The process of producing cooked noodles packaged for ambient temperature distribution according to claim 1, wherein the cooked noodles are acid-treated, at a pH of 4.0 to 5.0 low-pH, wherein said cooked noodles have been treated with a solution containing at least one of sugar and non-sugar sweeteners and a solution containing a sodium chloride.

6. The process of producing cooked noodles packages for ambient temperature distribution according to claim 2, wherein said substep of decreasing the inner pressure of the chamber until the inner temperature drops to 105° to 115° C. is decreased through a plurality of steps, wherein the pressure and temperature is decreased within 15OC at a time.

* * * * *